Jan. 6, 1925.

K. KOMORI

PACKING RING

Filed June 14, 1922

1,522,374

Inventor
K. Komori
By Marks & Clerk
Atty's

Patented Jan. 6, 1925.

1,522,374

UNITED STATES PATENT OFFICE.

KAICHI KOMORI, OF KOBE, JAPAN.

PACKING RING.

Application filed June 14, 1922. Serial No. 568,256.

*To all whom it may concern:*

Be it known that I, KAICHI KOMORI, a subject of the Emperor of Japan, residing at 6 of No. 55, 3-Chome, Nakayamate-dori, Kobe, Japan, have invented certain new and useful Improvements in Packing Rings, of which the following is a specification.

This invention relates to improvements in a packing ring, consisting of a tube of sheet iron, whose cross section is trapezoid or something like an isosceles triangle, formed into a ring by cutting deep incisions on the inside; and the object thereof is to obtain rings which when used together with common packing rings of soft material, will make tight and durable joint with a fewer number of soft material packing rings than are usually employed.

In the accompanying drawings.

Throughout all the figures the same reference number refers to the same or corresponding part.

Figure 1:
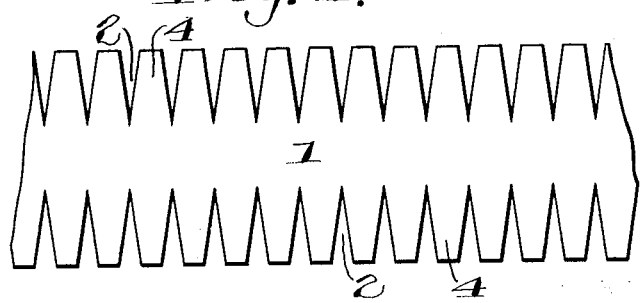
Fig. 1 is a plan view of a blank with which to form packing rings of my invention, cut with teeth on both sides.
Figure 2:
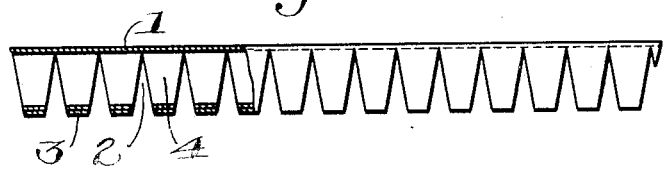
Fig. 2 is a side view, partly in section, of the blank after the teeth are bent to form a kind of a tube, and Fig. 3, a cross section of the same.
Figure 3:

To explain my invention more fully with reference to the figures, take a long, narrow piece of metal sheet, and cut teeth (4) on both sides making incisions (2) comparatively deep. Bend the teeth (4) at their base a little farther than they make right angle with the sheet. Then, bend the end of each tooth toward the opposite tooth on the other side, so that every pair of teeth overlaps each other at their ends as shown at (3). Thus a kind of sheet metal tube, whose bottom and top are plane, but the other two sides are slanting, and which is deeply incised at regular intervals, will be formed, as shown in Fig. 2, and it is clear that such tube can be bent into any curvature as far as the spaces between teeth admit, and formed into rings of any desired size.

Figure 5:
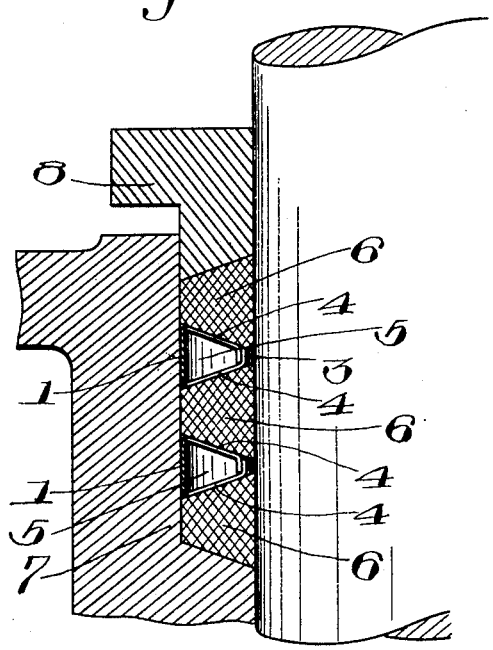
Fig. 5 is a side view, partly in section of a stuffing box in which rings of my invention are used together with common soft packing rings.
Figure 4:
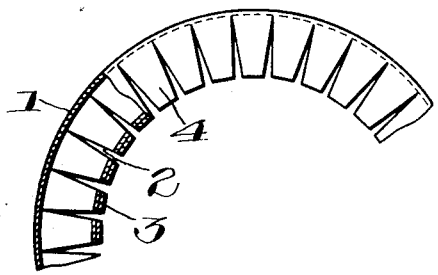
Fig. 4 is also a side view, partly in section after the tube is bent to form a ring.

Packing rings so formed are used in the stuffing box for rods or shafts alternately with common packing rings of asbestos or like soft material, as shown in Fig. 5, in which (6) are soft material and (5), metal rings. The metal rings are bent into such a size that their outer diameter is a little smaller than the inner diameter of the stuffing box and their inner diameter, a little larger than the diameter of the rod or shaft, so that they can be loosely inserted over the rod or shaft and in the stuffing box. Now, when the required numbers of packing rings are arranged in the stuffing box, soft and metal rings alternately, and compressed with a gland (8), the soft material rings, which may be either flat or round, being pressed by the inclined planes of the metal rings, will be squeezed into a shape, a cross section of which is a trapezoid, and at the same time will be pressed by the same planes against the surface of the shaft and that of the stuffing box. Moreover, as the thickness of metal rings is not great at the inside, and soft rings are thicker toward that side, the latter extends over the inner surface of the former until any two adjacent soft rings become practically continuous on that side. In this manner a perfectly steam tight and also air tight joint will be obtained. If soft packings alone are used, as has hitherto been the case, not only a larger number of rings must be used, but also they must be compressed until they become hard in order to obtain an air tight joint. On the other hand, if metal rings of my invention are used together with soft rings, the latter assumes a form in which a cross section is a trapezoid, and remains soft and elastic, that is, in a condition best fitted as packing rings. Besides, being thicker toward the rod or shaft, in fact being continuous on that surface, and being driven against it by the slanting surfaces of the metal rings, an efficient impervious and durable joint may be obtained with a smaller number of soft rings. Another advantage of my invention is this that, while metal packing rings, as hitherto made, must be specially made for the stuffing box and the rod or shaft with which they are to be used, according to my invention, the trapezoid tube may be cut to any length desired so as to form rings that will fit a desired rod or shaft. Moreover, with my method of packing a stuffing box, the spaces let therein can be efficiently stuffed as in the case of labyrinth packing.

Claims:

1. A packing ring consisting of a sheet metal tube having a substantial trapezoidal cross section and V-shaped incisions in the inner part and in two sides extending in proximity to the outer part.

2. A packing ring consisting of a sheet metal tube of annular form, said tube including an outer part converging sides and an inner part, the material constituting the inner part being overlapped, and the inner part and sides having V-shaped incisions extending to adjacent the outer part.

In testimony whereof I have affixed my signature.

KAICHI KOMORI. [L. S.]